(12) United States Patent
Andou et al.

(10) Patent No.: US 7,707,989 B2
(45) Date of Patent: May 4, 2010

(54) INTAKE PORT STRUCTURE FOR ENGINE

(75) Inventors: Hirokazu Andou, Saitama (JP); Gou Tanaka, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/296,480

(22) PCT Filed: Apr. 11, 2007

(86) PCT No.: PCT/JP2007/057985

§ 371 (c)(1),
(2), (4) Date: Oct. 8, 2008

(87) PCT Pub. No.: WO2007/132606

PCT Pub. Date: Nov. 22, 2007

(65) Prior Publication Data

US 2009/0159041 A1 Jun. 25, 2009

(30) Foreign Application Priority Data

May 11, 2006 (JP) .............................. 2006-132457

(51) Int. Cl.
*F02B 31/00* (2006.01)
(52) U.S. Cl. .................. 123/306; 123/188.14
(58) Field of Classification Search ................. 123/306, 123/608
See application file for complete search history.

(56) References Cited

U.S. PATENT DOCUMENTS

| | | | | |
|---|---|---|---|---|
| 2,593,769 A | * | 4/1952 | Kollsman | ................... 123/255 |
| 4,312,309 A | * | 1/1982 | Nakanishi et al. | ...... 123/188.14 |
| 4,466,398 A | * | 8/1984 | Nakanishi et al. | ...... 123/188.14 |
| 4,519,346 A | * | 5/1985 | Nakanishi et al. | ...... 123/188.14 |
| 4,592,315 A | * | 6/1986 | Kobayashi et al. | .......... 123/308 |

(Continued)

FOREIGN PATENT DOCUMENTS

JP 7-34884 2/1995

(Continued)

OTHER PUBLICATIONS

International Search Report of PCT/JP2007/057985, date of mailing Jun. 26, 2007.

*Primary Examiner*—Stephen K Cronin
*Assistant Examiner*—Sizo B Vilakazi
(74) *Attorney, Agent, or Firm*—Westerman, Hattori, Daniels & Adrian, LLP

(57) ABSTRACT

In an engine combustion chamber, a first intake port (19) formed from a straight port has a throat portion (43) formed in a linear shape and opening in a tangential direction of the inner periphery of a cylinder (11*a*), thus generating a first swirl (S1), and a second intake port (20) formed from a helical port has a throat portion (44) formed in a helical shape, thus generating a second swirl (S2) inside the first swirl (S1) in the same direction as that of the first swirl (S1). In this way, even with the first and second intake ports (19, 20) hardly curved overall, it is possible to efficiently generate first and second swirls (S1, S2) that do not interfere with each other, and it becomes possible to reduce the cost of machining the cylinder head, make the cylinder head compact, and simplify the structure of the cylinder head.

2 Claims, 7 Drawing Sheets

U.S. PATENT DOCUMENTS

| | | | |
|---|---|---|---|
| 4,725,955 A * | 2/1988 | Kobayashi et al. | 701/103 |
| 4,909,210 A * | 3/1990 | Shimada et al. | 123/308 |
| 5,435,283 A * | 7/1995 | Zehr | 123/306 |
| 5,479,889 A * | 1/1996 | Sato et al. | 123/308 |
| 5,558,061 A * | 9/1996 | Suminski | 123/306 |
| 6,003,485 A * | 12/1999 | Kawashima et al. | 123/188.14 |
| 6,250,281 B1 * | 6/2001 | Takii et al. | 123/308 |
| 6,431,140 B1 * | 8/2002 | Nishimura et al. | 123/306 |
| 6,655,347 B2 * | 12/2003 | Takamiya et al. | 123/306 |
| 2001/0006056 A1 * | 7/2001 | Ichikawa | 123/308 |
| 2001/0050070 A1 * | 12/2001 | Xu et al. | 123/295 |
| 2001/0052333 A1 * | 12/2001 | Ozeki | 123/193.5 |
| 2002/0112693 A1 * | 8/2002 | Stutz et al. | 123/308 |
| 2004/0016416 A1 * | 1/2004 | Ichihara et al. | 123/302 |

FOREIGN PATENT DOCUMENTS

| | | | |
|---|---|---|---|
| JP | 9-287461 A | | 11/1997 |
| JP | 10-37751 A | | 2/1998 |
| JP | 10037751 A | * | 2/1998 |
| JP | 2002-188451 A | | 7/2002 |
| JP | 2002188451 A | * | 7/2002 |

* cited by examiner

INTAKE PORT STRUCTURE FOR ENGINE

TECHNICAL FIELD

The present invention relates to an intake port structure for an engine that provides communication between first and second intake ports extending in a direction perpendicular to a cylinder line and respective first and second intake valve holes opening in a combustion chamber.

BACKGROUND ART

An arrangement in which, in an engine equipped with two intake ports corresponding to each cylinder, the intake ports being formed from straight ports, a swirl is generated by individually curving throat portions of the two intake ports is known from Patent Publication 1 below.

That is, a swirl is generated in a clockwise direction within the cylinder by making one intake port disposed on the right-hand side relative to the cylinder axis curve leftward so as to be connected to the inner periphery of the cylinder in a tangential direction, and another swirl is generated in a clockwise direction within the cylinder by making the other intake port disposed on the left-hand side relative to the cylinder axis first curve leftward so as to avoid the one intake port and then curve rightward in front of the one intake port so as to be connected to the inner periphery of the cylinder in a tangential direction.

Patent Publication 1: Japanese Patent Application Laid-open No. 7-34884

DISCLOSURE OF INVENTION

Problems to be Solved by the Invention

In the above-mentioned conventional arrangement, since a swirl is generated by connecting both of the two intake ports to the inner periphery of the cylinder in the tangential direction, it is necessary to strongly curve and maneuver the two intake ports, and it is necessary to extend beyond the cylinder line the other intake port from the cylinder head intake side to the exhaust side, and this causes the problems of an increase in the cost of machining the cylinder head, an increase in the size of the cylinder head, and the structure of the cylinder head being made complicated.

Furthermore, if as an intake port a helical port is employed instead of the straight port, since it is unnecessary to connect the intake port to the inner periphery of the cylinder in a tangential direction, it becomes unnecessary to curve the intake port, but if two helical ports are employed, swirls generated by the two ports interfere with each other, and there is a possibility that sufficient performance will not be obtained.

The present invention has been accomplished in the light of the above-mentioned circumstances, and it is an object thereof to generate a sufficient swirl while simplifying the structures of two intake ports that communicate with an engine combustion chamber.

MEANS FOR SOLVING THE PROBLEMS

In order to attain the above object, according to a first aspect of the present invention, there is proposed an intake port structure for an engine that provides communication between first and second intake ports extending in a direction perpendicular to a cylinder line and respective first and second intake valve holes opening in a combustion chamber, characterized in that the first intake port is a straight port in which a throat portion is formed in a linear shape and opens in a tangential direction of the inner periphery of a cylinder, the first intake port generating a first swirl, and the second intake port is a helical port in which a throat portion is formed in a helical shape, the second intake port generating a second swirl inside the first swirl in the same direction as that of the first swirl.

According to a second aspect of the present invention, in addition to the first aspect, the second intake port comprises a helical outer wall formed along a peripheral edge of the second intake valve hole, a helical inner wall formed radially outside a valve stem positioned at the center of the second intake valve hole, a first guide wall connected to the helical outer wall and extending in a direction tangential to the second intake valve hole, and a second guide wall connected continuously to the helical inner wall from a state in which it is parallel to the first guide wall, and is formed so that as an interwall distance of the first and second guide walls decreases toward the downstream side in the intake air flow direction, an interwall distance in a direction perpendicular to the interwall distance between the first and second guide walls increases.

According to a third aspect of the present invention, in addition to the first or second aspect, the first and second intake ports are positioned on one side of the cylinder line.

Effects of the Invention

In accordance with the first aspect of the present invention, the first intake port, which is formed from a straight port, has a throat portion formed in a straight line shape and opens in a tangential direction of the inner periphery of the cylinder so as to generate a first swirl, and the second intake port, which is formed from a helical port, has a throat portion formed in a helical shape so as to generate a second swirl, in the same direction as that of the first swirl, inside the first swirl. In this way, even with the first and second intake ports hardly curved overall, it is possible to efficiently generate first and second swirls that do not interfere with each other, and it becomes possible to reduce the cost of machining the cylinder head, make the cylinder head compact, and simplify the structure of the cylinder head.

Furthermore, in accordance with the second aspect of the present invention, even when the width, viewed in the cylinder axis direction, of the throat portion of the second intake port having the helical outer wall and the helical inner wall in order to generate a swirl is reduced, since, as the interwall distance between the first and second guide walls connected to the helical outer wall and the helical inner wall decreases toward the downstream side in the intake air flow direction, the interwall distance in a direction perpendicular to the interwall distance of the first and second guide walls is increased, it is possible to minimize any increase in flow resistance of the intake air in the throat portion.

In accordance with the third aspect of the present invention, since the first and second intake ports are disposed on one side of the cylinder line, it is possible to minimize the length of the intake port and simplify the structure of the cylinder head.

EXPLANATION OF REFERENCE NUMERALS AND SYMBOLS

Figure 1:
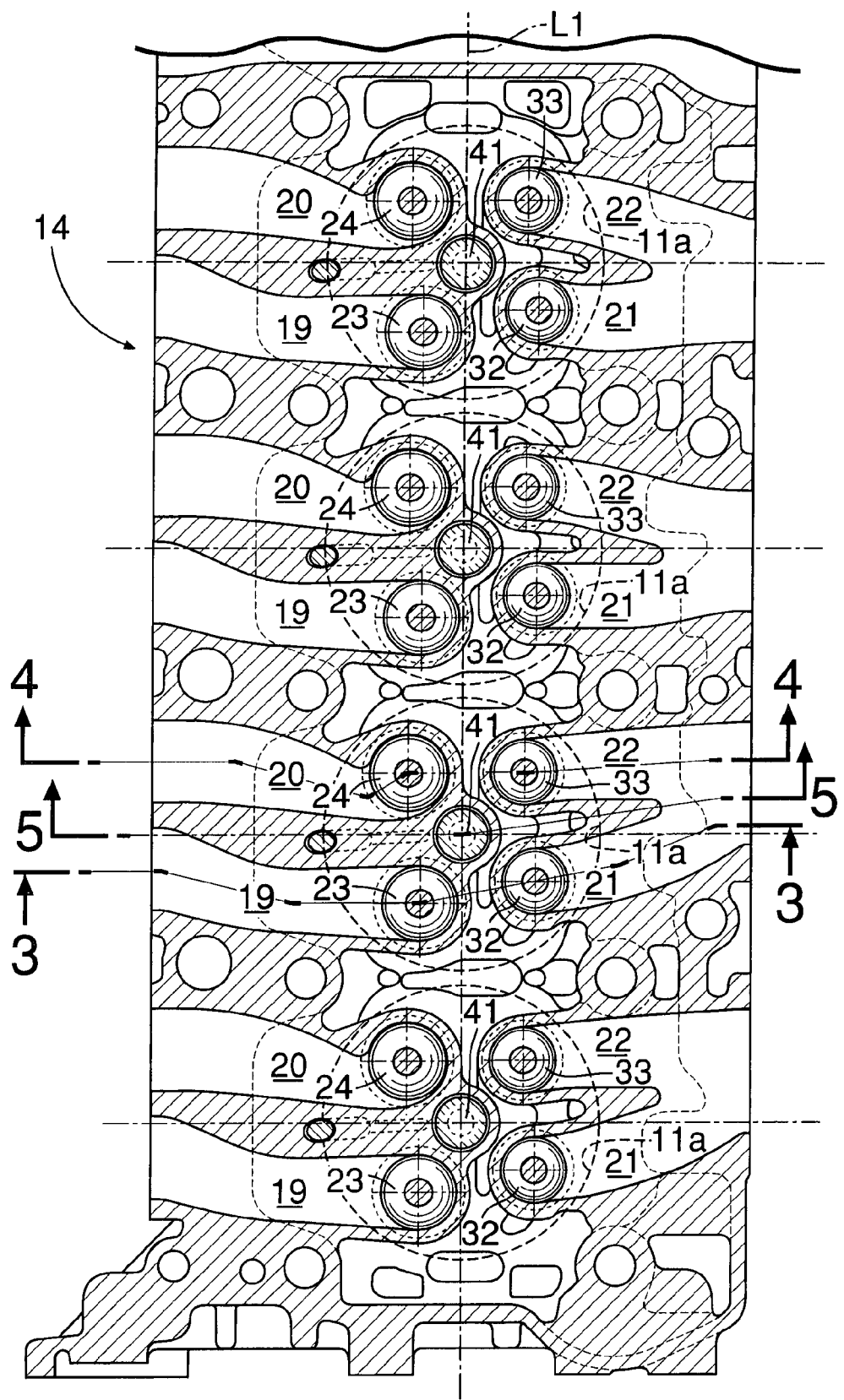
FIG. 1 is a horizontal sectional view (sectional view along line 1-1 in FIG. 3) of a cylinder head of a diesel engine (first embodiment).
Figure 2:
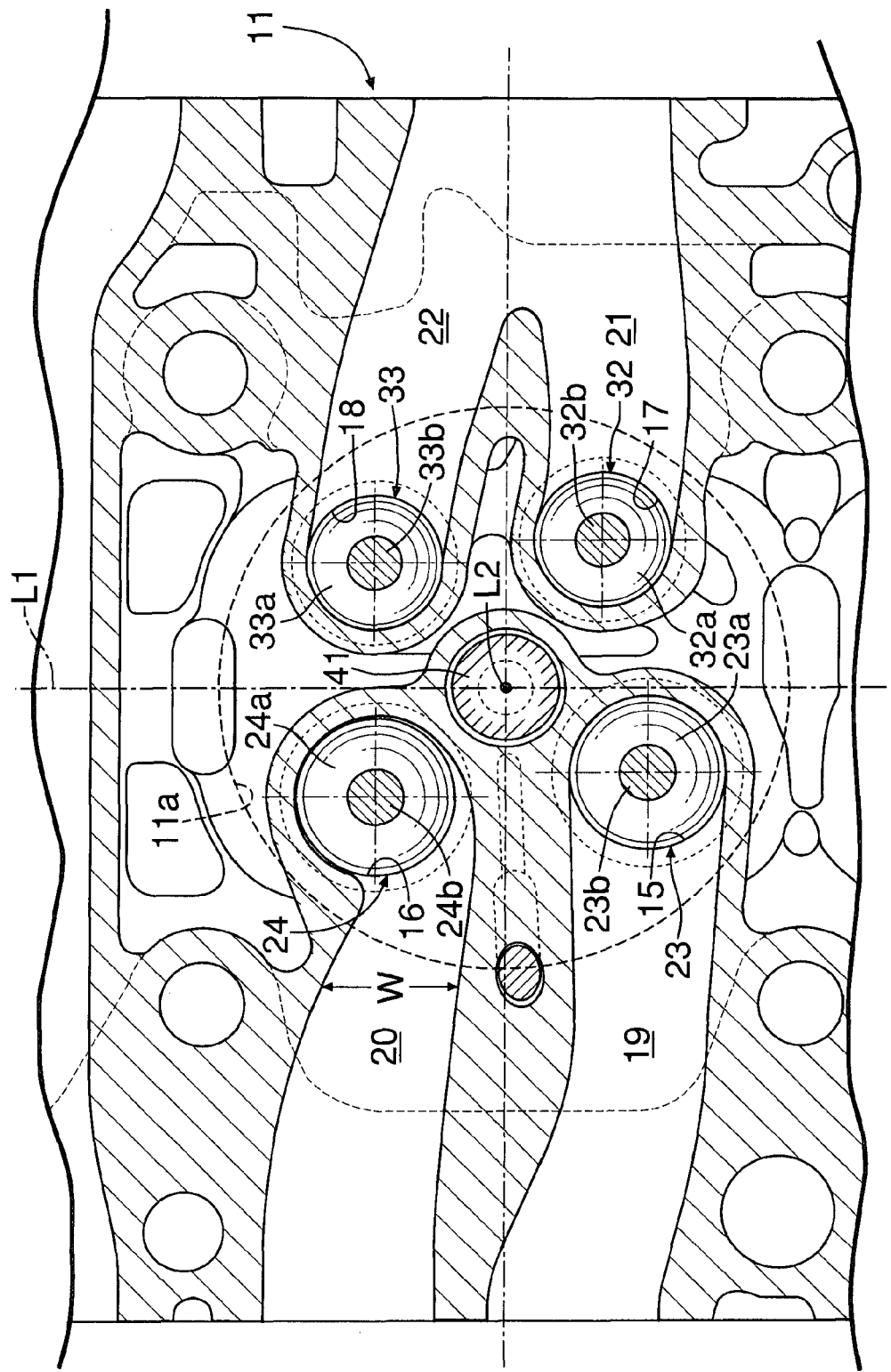
FIG. 2 is an enlarged view of an essential part of FIG. 1 (first embodiment).
Figure 3:
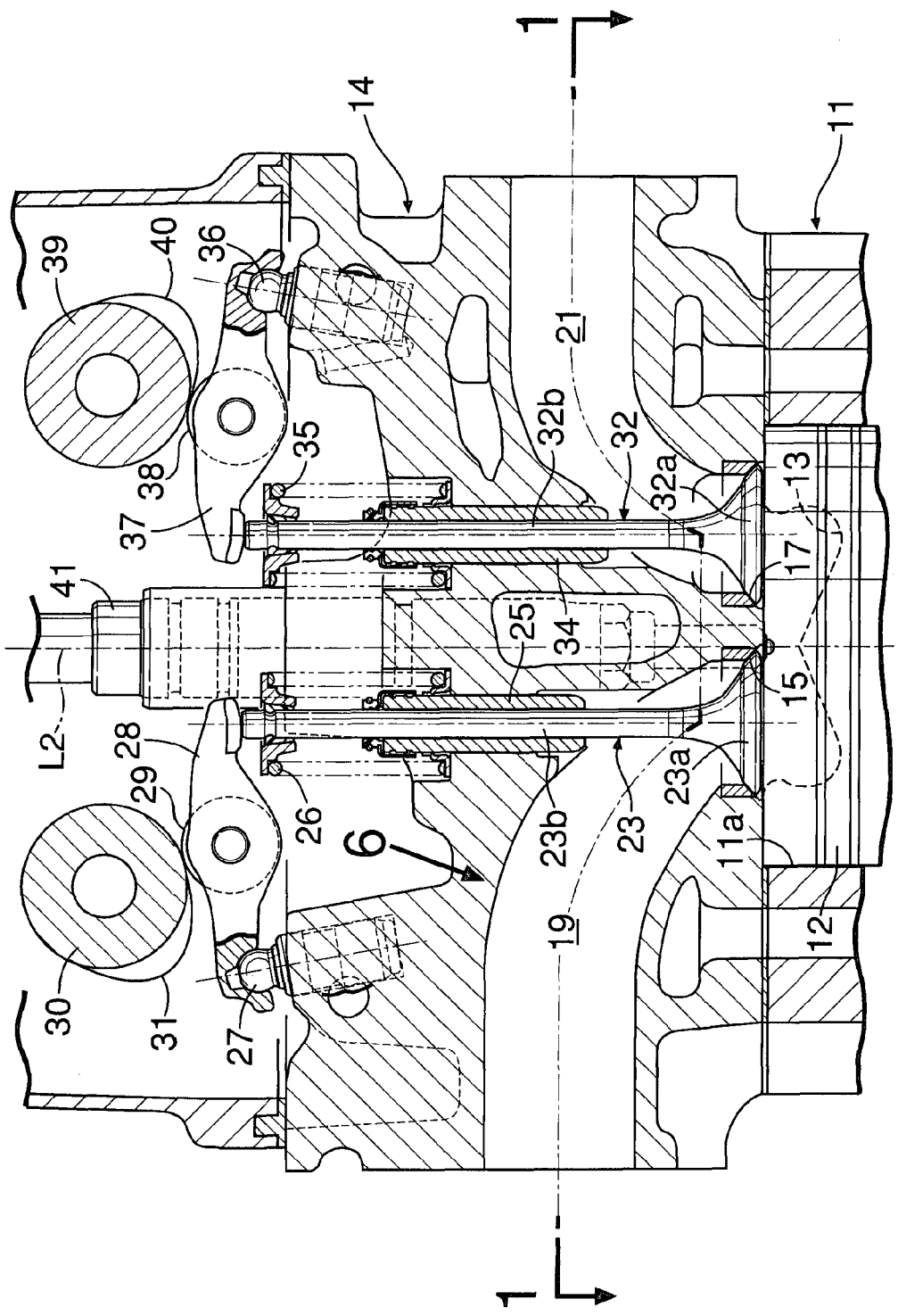
FIG. 3 is a sectional view along line 3-3 in FIG. 1 (first embodiment).
Figure 4:
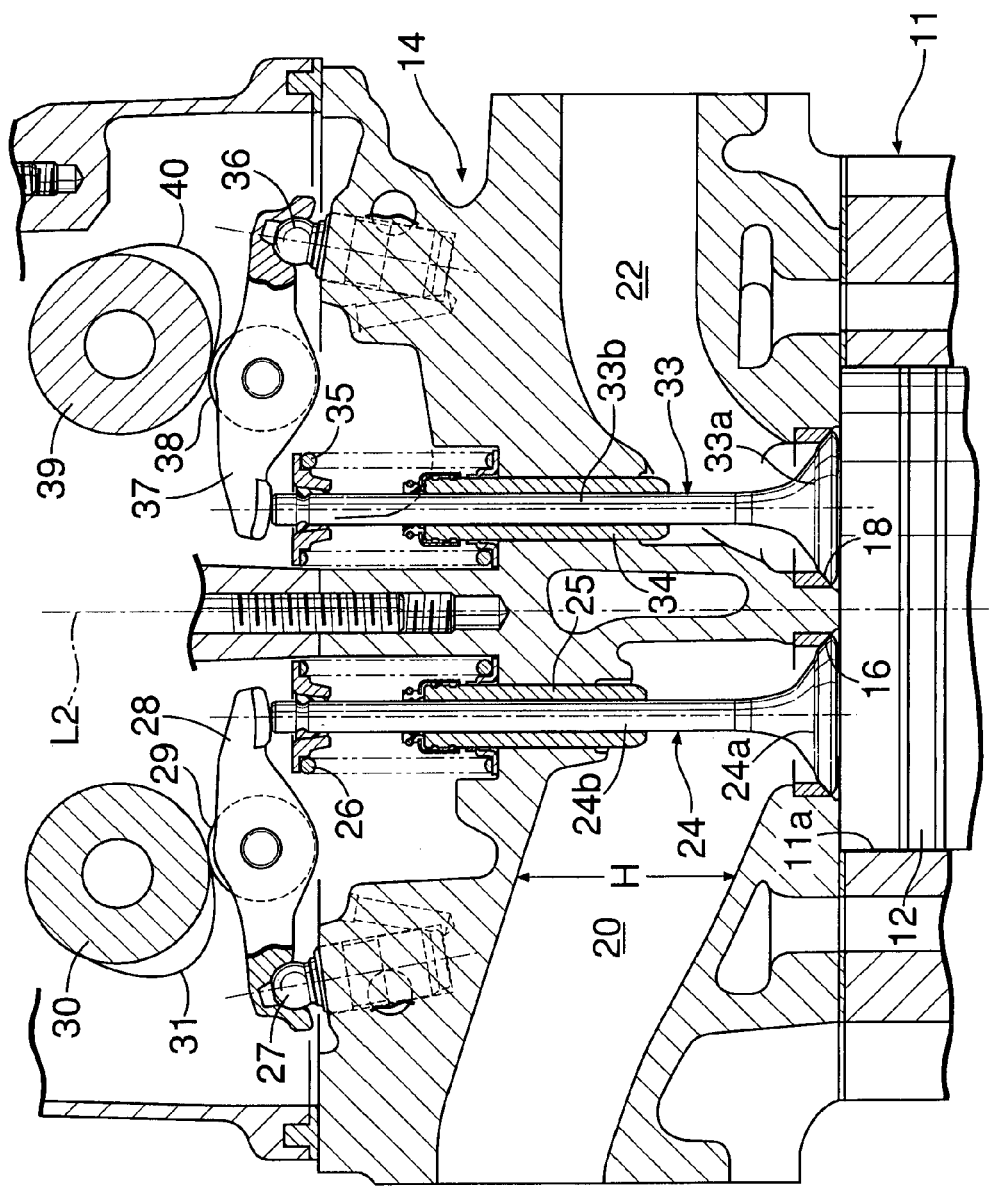
FIG. 4 is a sectional view along line 4-4 in FIG. 1 (first embodiment).
Figure 5:
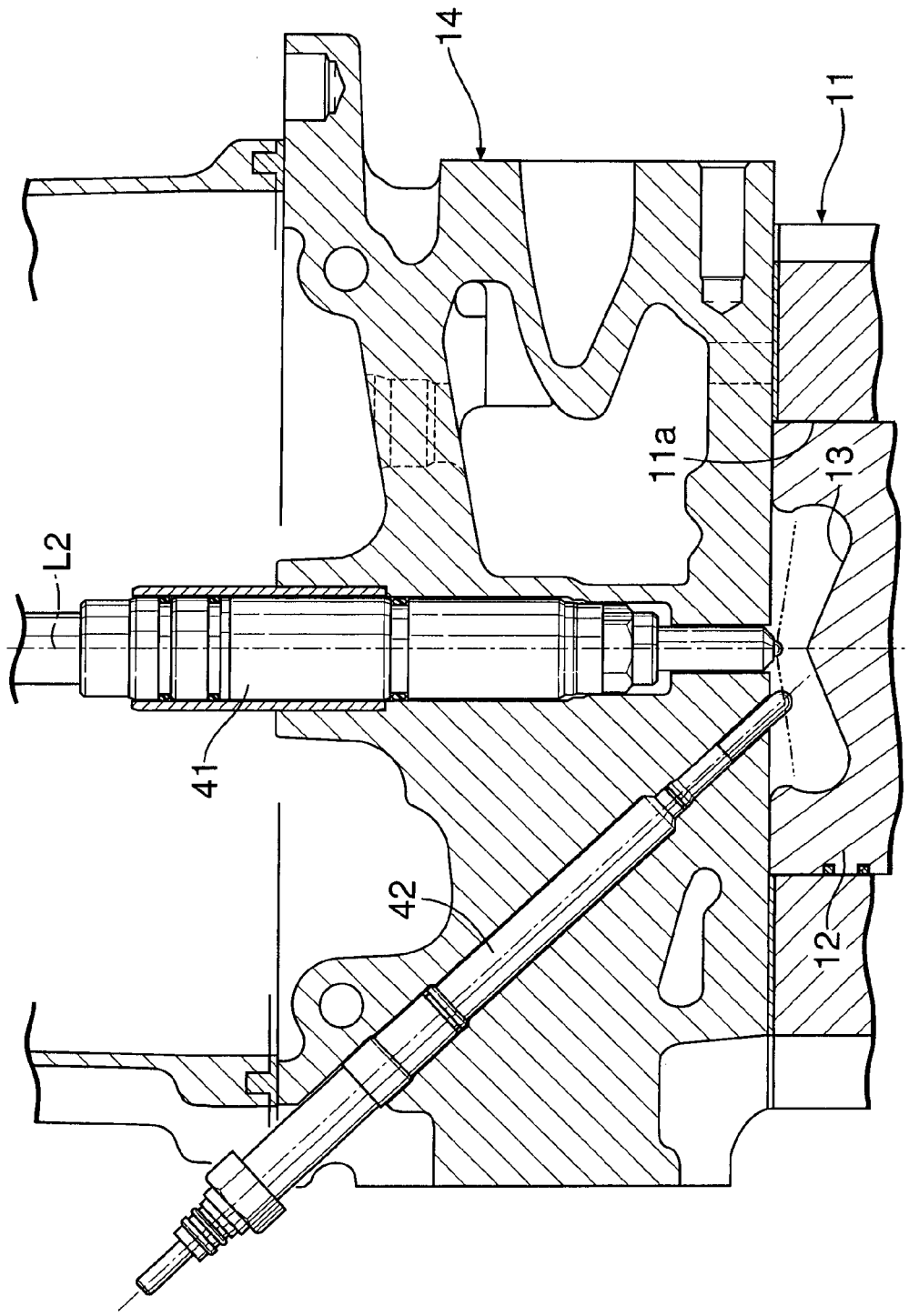
FIG. 5 is a sectional view along line 5-5 in FIG. 1 (first embodiment).

11a Cylinder
13 Combustion chamber
15 First intake valve hole
16 Second intake valve hole
19 First intake port
20 Second intake port
24b Valve stem
43 Throat portion
44 Throat portion
44a Helical outer wall
44b Helical inner wall
45 First guide wall
46 Second guide wall
H Interwall distance
L1 Cylinder line
S1 First swirl
S2 Second swirl
W Interwall distance Best Mode for Carrying out the Invention A mode for carrying out the present invention is explained below by reference to the attached drawings.

Embodiment 1

FIG. 1 to FIG. 7 show a mode for carrying out the present invention.

As shown in FIG. 1 to FIG. 5, an in-line four cylinder diesel engine includes four pistons 12 slidably fitted into four cylinders 11a formed in a cylinder block 11, and a reentrant-type combustion chamber 13 is recessed in a top face of each of the pistons 12. First and second intake valve holes 15 and 16 and first and second exhaust valve holes 17 and 18 facing the top face of each of the cylinders 11 open on a lower face of a cylinder head 14, which is joined to an upper face of the cylinder block 11, first and second intake ports 19 and 20 communicate with the first and second intake valve holes 15 and 16, and first and second exhaust ports 21 and 22 communicate with the first and second exhaust valve holes 17 and 18.

The first and second intake ports 19 and 20 are disposed on one side of a cylinder line L1 joining the centers of the four cylinders 11a, and the first and second exhaust ports 21 and 22 are disposed on the other side. The first and second intake ports 19 and 20 each independently extend in a substantially straight line in a direction perpendicular to the cylinder line L1, and downstream ends of the first and second exhaust ports 21 and 22 are merged. When the piston 12 is at top dead center, a squish area is formed between the upper face of the piston 12 and the lower face of the cylinder head 14.

First and second intake valves 23 and 24 include valve bodies 23a and 24a opening and closing the first and second intake valve holes 15 and 16, and valve stems 23b and 24b connected to the valve bodies 23a and 24a; the valve stems 23b and 24b, which are disposed in parallel to a cylinder axis L2, are slidably supported on valve guides 25 and 25 and urged by intake valve springs 26 and 26 in a valve-closing direction. An intake rocker arm 28 having one end supported on a hydraulic tappet 27 has the other end abutting against a stem end of the first and second intake valves 23 and 24, and a roller 29 provided in a middle portion abuts against an intake cam 31 provided on an intake camshaft 30.

First and second exhaust valves 32 and 33 include valve bodies 32a and 33a opening and closing the first and second exhaust valve holes 17 and 18, and valve stems 32b and 33b connected to the valve bodies 32a and 33a; the valve stems 32b and 33b, which are disposed in parallel to the cylinder axis L2, are slidably supported on valve guides 34 and 34 and urged by exhaust valve springs 35 and 35 in a valve-closing direction. An exhaust rocker arm 37 having one end supported on a hydraulic tappet 36 has the other end abutting against a stem end of the first and second exhaust valves 32 and 33, and a roller 38 provided in a middle portion abuts against an exhaust cam 40 provided on an exhaust camshaft 39.

The extremity of an injector 41 positioned on the cylinder axis L2 and the extremity of a glow plug 42 inclined relative to the cylinder axis L2 are disposed so as to face the combustion chamber 13.

When the intake camshaft 30 rotates, the intake rocker arm 28, which has the roller 29 pushed by the intake cam 31, swings with the hydraulic tappet 27 as a fulcrum, and pushes the stem end of the first and second intake valves 23 and 24 against a resilient force of the intake valve springs 26 and 26, thus opening the valves. Furthermore, when the exhaust camshaft 39 rotates, the exhaust rocker arm 37, which has the roller 38 pushed by the exhaust cam 40, swings with the hydraulic tappet 36 as a fulcrum, and pushes the stem end of the first and second exhaust valves 32 and 33 against a resilient force of the exhaust valve springs 35 and 35, thus opening the valves.

Figure 6:
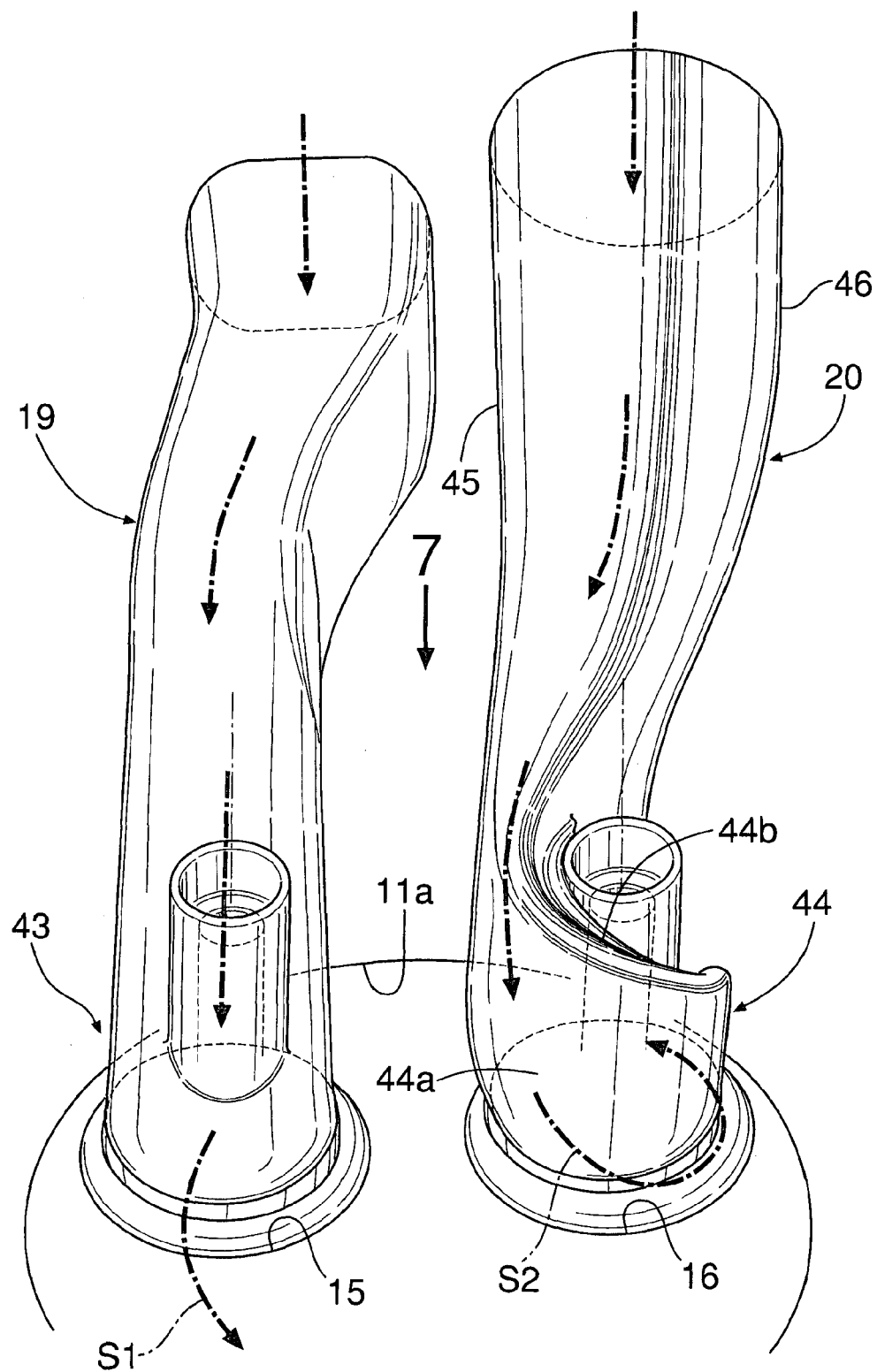
FIG. 6 is a perspective view of first and second intake ports (view from arrow 6 in FIG. 3) (first embodiment).
Figure 7:
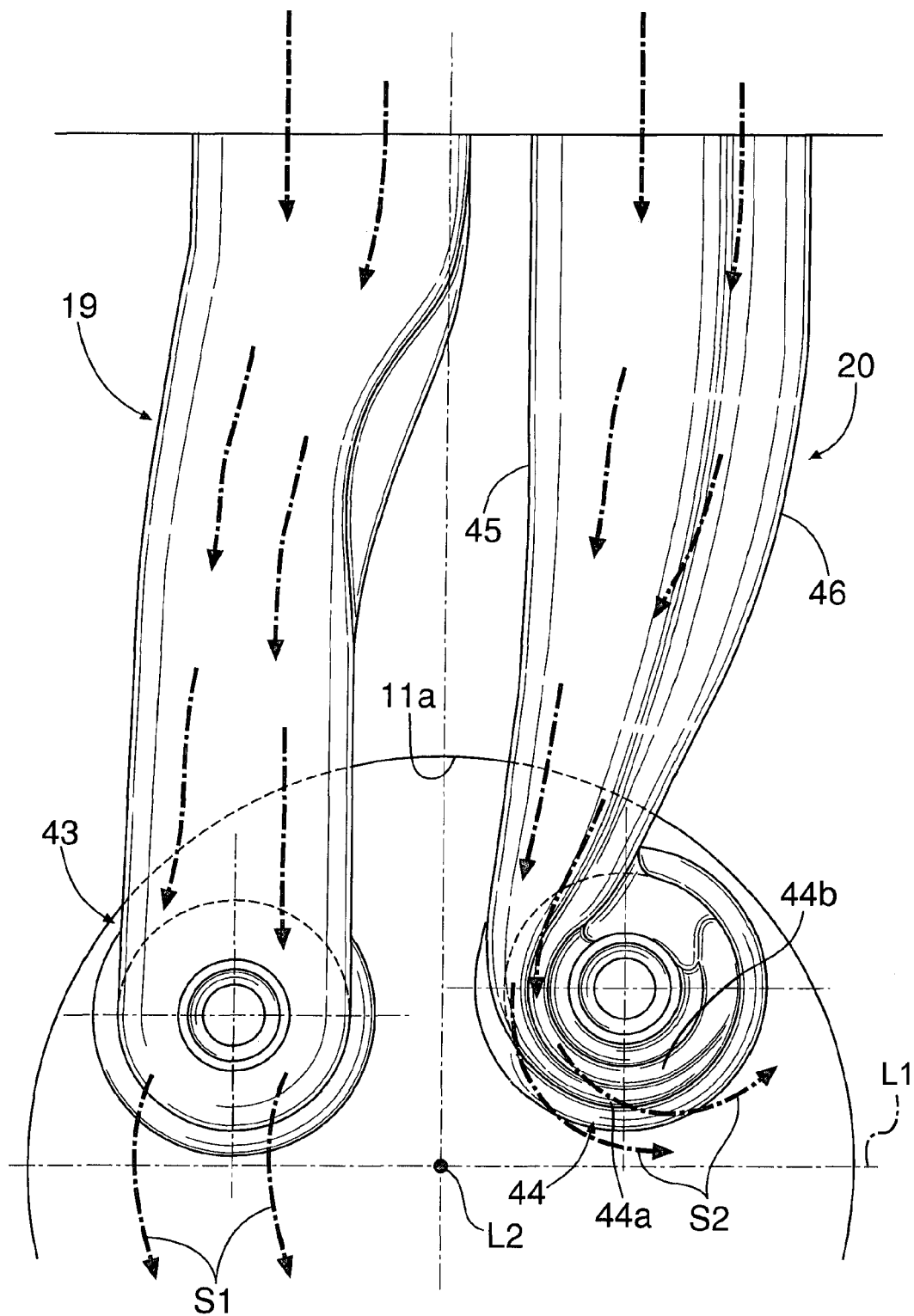
FIG. 7 is a view from arrow 7 in FIG. 6 (first embodiment).

As shown in FIG. 6 and FIG. 7, the first intake port 19 is a straight port in which a throat portion 43 immediately upstream of the first intake valve hole 15 extends linearly, and is connected to the inner periphery of the cylinder 11a in a tangential direction when viewed in the cylinder axis L2 direction. Therefore, when the first intake valve 23 opens and intake air is guided from the first intake port 19 into the cylinder 11a, the intake air flows in a direction tangential to the inner periphery of the cylinder 11a, thus generating a first swirl S1 so as to surround the cylinder axis L2.

The second intake port 20 is a helical port in which a throat portion 44 immediately upstream of the second intake valve hole 16 extends in a helical shape so as to surround the valve stem 24b of the second intake valve 24. The throat portion 44 includes a helical outer wall 44a formed so as to be connected to the inner periphery of the second intake valve hole 16 in a tangential direction, and a helical inner wall 44b formed radially outside the valve stem 24b of the second intake valve 24; the interwall distance between the swivel outer wall 44a and the swivel inner wall 44b becomes narrower the further downstream in the intake air flow direction it is. Although this intensifies a second swirl S2 generated by the second intake port 20, there is the problem that the flow resistance of the intake air in the throat portion 44 increases.

A first guide wall 45 connected to the upstream side of the swivel outer wall 44a extends in a substantially straight line, but a second guide wall 46 connected to the swivel inner wall 44b so as to face the first guide wall 45 curves in a direction such that the further downstream it is the closer it gets to the first guide wall 45. Since the width of the second intake port 20 when viewed in the cylinder axis L2 direction, that is, an interwall distance W (see FIG. 2) between the first and second guide walls 45 and 46, becomes narrower the further downstream it is, the flow resistance of intake air increases further. However, in the present embodiment, since an interwall distance H (see FIG. 4) of the second intake port 20 when viewed in a direction perpendicular to the cylinder axis L2 becomes wider the further downstream it is, the narrowing of the throat portion 44 of the second intake port 20 and the narrowing of the width W of the second intake port 20 upstream thereof are compensated for by the widening in the height H of the second intake port 20, thereby minimizing any increase in the flow resistance of the intake air of the second intake port 20, which is formed from a strongly constricted helical port.

As described above, among the first and second intake ports 19 and 20 communicating with the interior of the cylinder 11a, the first swirl SI is generated by connecting the first intake port 19, which is formed from a straight port, to the inner periphery of the cylinder 11a in a tangential direction, the second swirl S2 is generated by the second intake port 20, which is a helical port, inside the first swirl S1 in the same direction as that of the first swirl S1, and it is therefore possible to minimize interference between the first and second swirls S1 and S2, thus enabling a strong swirl to be generated effectively. Moreover, the swirls S1 and S2 can be efficiently generated while disposing the first and second intake ports 19 and 20 substantially linearly in a direction perpendicular to the cylinder line L1, and it is therefore possible to reduce the cost of machining the cylinder head 14, make the cylinder head 14 compact, and simplify the structure of the cylinder head 14.

In particular, since the first and second intake ports 19 and 20 are disposed on one side relative to the cylinder axis L1 and do not extend to the opposite side of the cylinder axis L1 (the first and second exhaust ports 21 and 22 side), it is possible to minimize the length of the first and second intake ports 19 and 20, thereby enabling the cost of machining the cylinder head 14 to be further reduced, the cylinder head 14 to be made more compact, and the structure of the cylinder head 14 to be further simplified.

A mode for carrying out the present invention is explained above, but the present invention may be modified in a variety of ways as long as the modifications do not depart from the spirit and scope of the present invention.

For example, in the embodiment an in-line four cylinder engine is illustrated, but the present invention may be applied to an engine with any number of cylinders. In the case of a single cylinder engine or a V2 engine, the cylinder line direction L1 referred to in the present invention is defined as a direction parallel to the crankshaft.

The invention claimed is:

1. An intake port structure for an engine, comprising:
   first and second intake ports extending in a direction perpendicular to a cylinder line and communicating in a combustion chamber of the engine and
   respective first and second intake valve holes opening in the combustion chamber,
   wherein the first intake port is a straight port in which a throat portion is formed in a linear shape and opens in a tangential direction of an inner periphery of a cylinder wall, the first intake port being generally perpendicular to the cylinder line, the first intake port generating a first swirl, and the second intake port is a helical port in which a throat portion is formed in a helical shape, the second intake port generating a second swirl inside the first swirl in the same direction as that of the first swirl and further wherein,
   the second intake port comprises a helical outer wall formed along a peripheral edge of the second intake valve hole, a helical inner wall formed inside of said helical outer wall and radially outside a valve stem positioned at the center of the second intake valve hole, a first guide wall connected to the helical outer wall and extending in a direction tangential to the second intake valve hole and substantially perpendicular to the cylinder line, and a second guide wall connected continuously to the helical inner wall from a state in which it is substantially parallel to the first guide wall, and is formed so that as a first interwall distance of the first and second guide walls decreases toward the downstream side in the intake air flow direction, a second interwall distance, in a direction perpendicular to the first interwall distance, increases.

2. The intake port structure for the engine according to claim 1, wherein the first and second intake ports are positioned on one side of the cylinder line.

* * * * *